July 5, 1932.  K. S. HOWARD ET AL  1,865,520
RAILWAY VEHICLE STRUCTURE
Filed Aug. 24, 1927  6 Sheets-Sheet 1
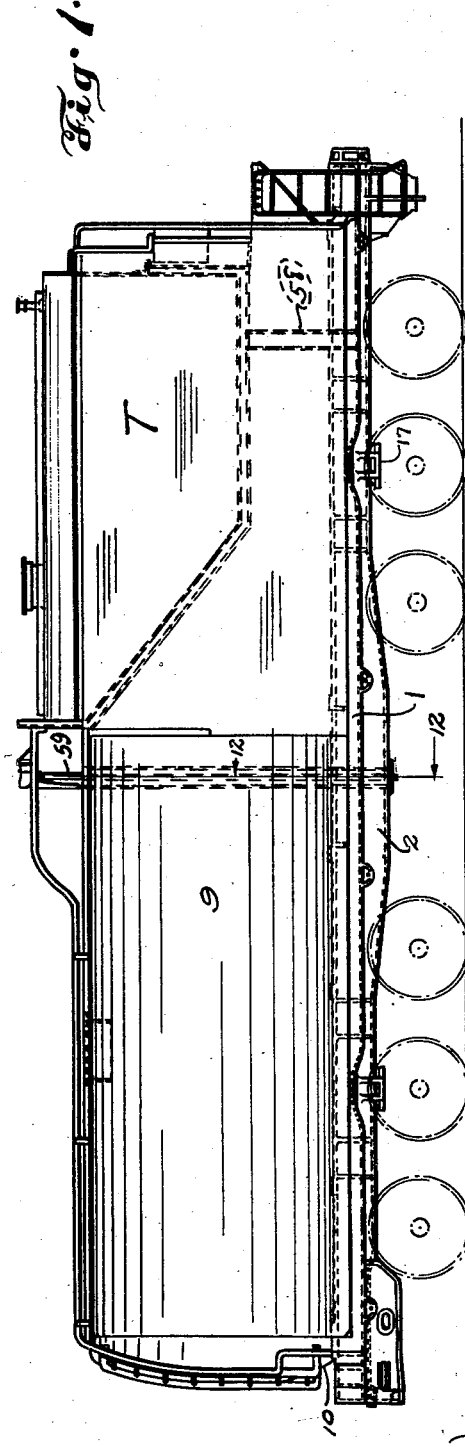
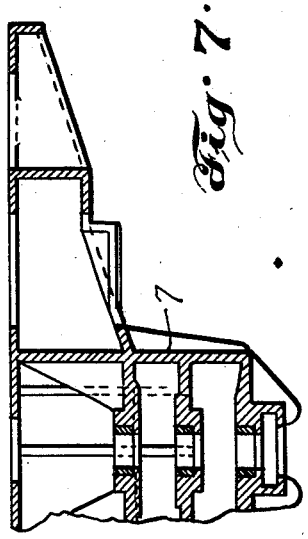
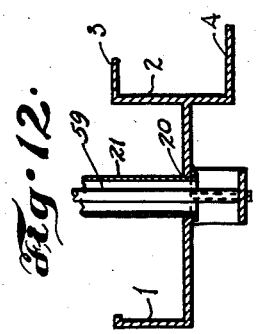
INVENTORS
Karl S. Howard
Einar G. Hallquist
By Cornwall, Bedell & Janus
ATTORNEYS July 5, 1932.  K. S. HOWARD ET AL  1,865,520
RAILWAY VEHICLE STRUCTURE
Filed Aug. 24, 1927   6 Sheets-Sheet 2
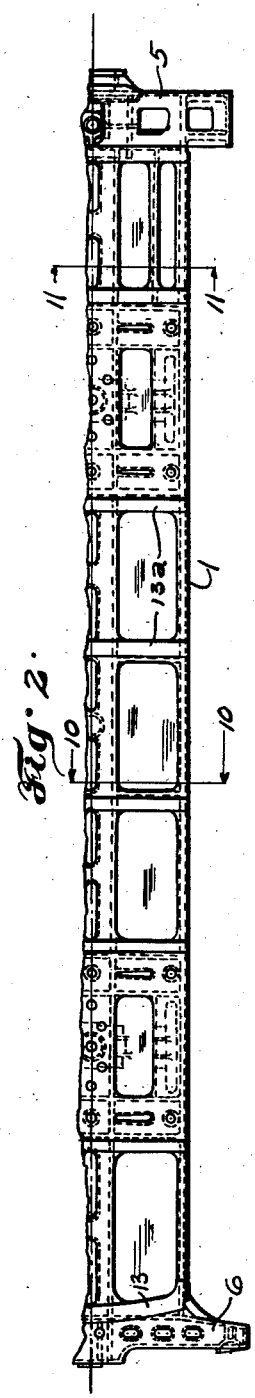
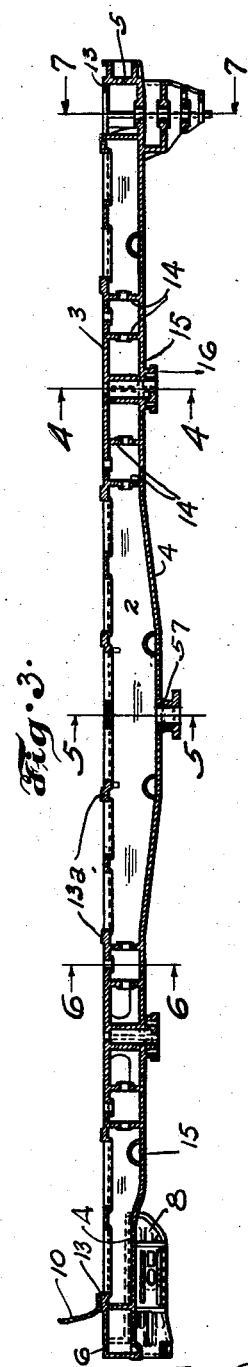
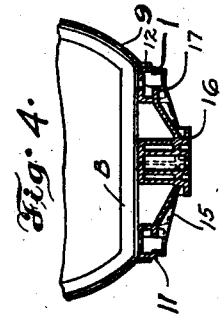
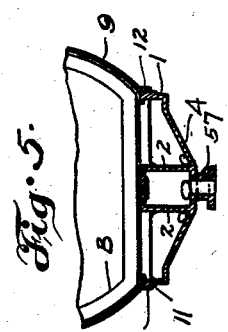
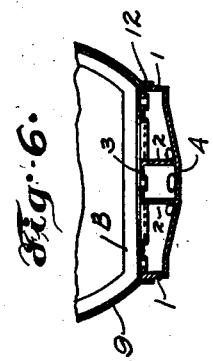
INVENTORS
Karl S. Howard
Einar G. Hallquist
By Cornwall, Bedell & James
ATTORNEYS

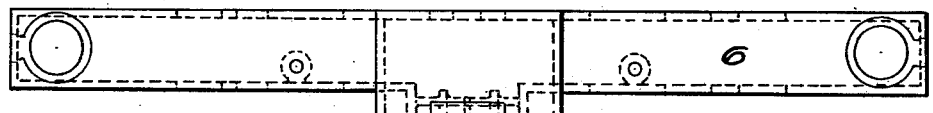
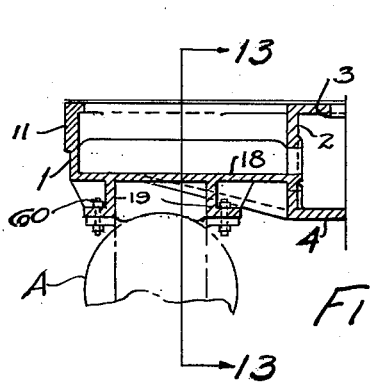
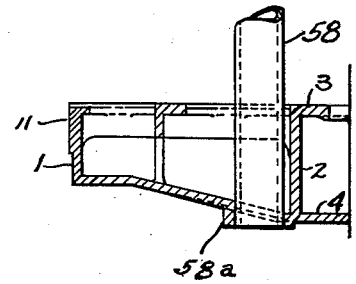
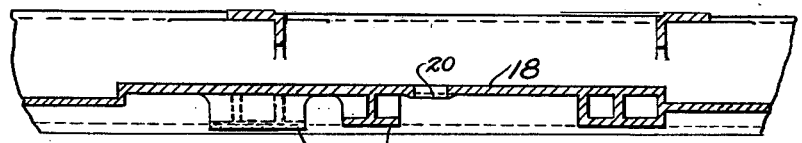
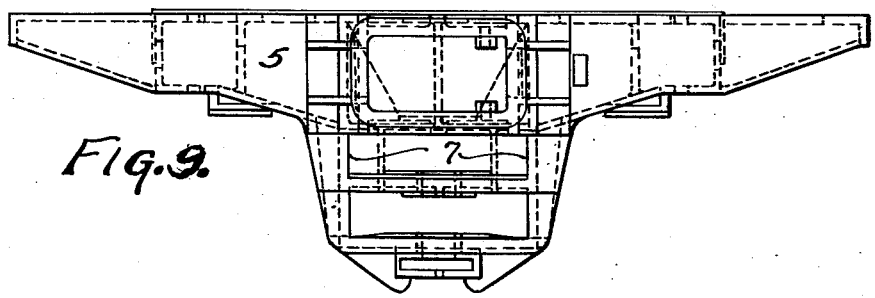

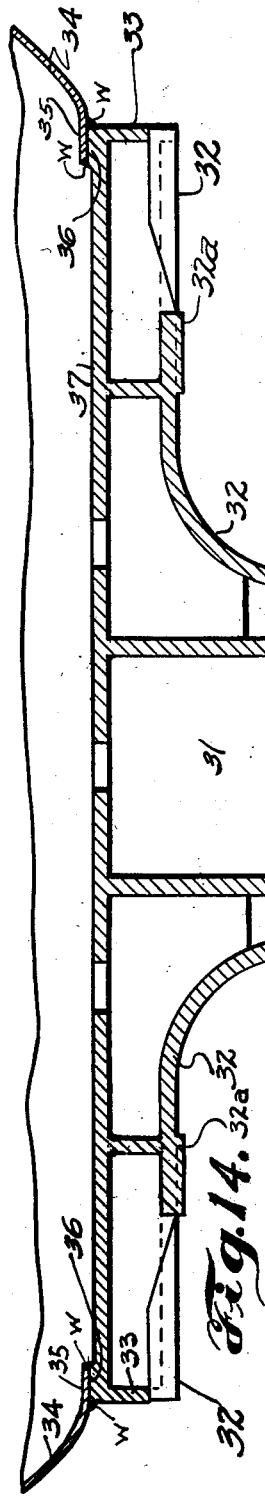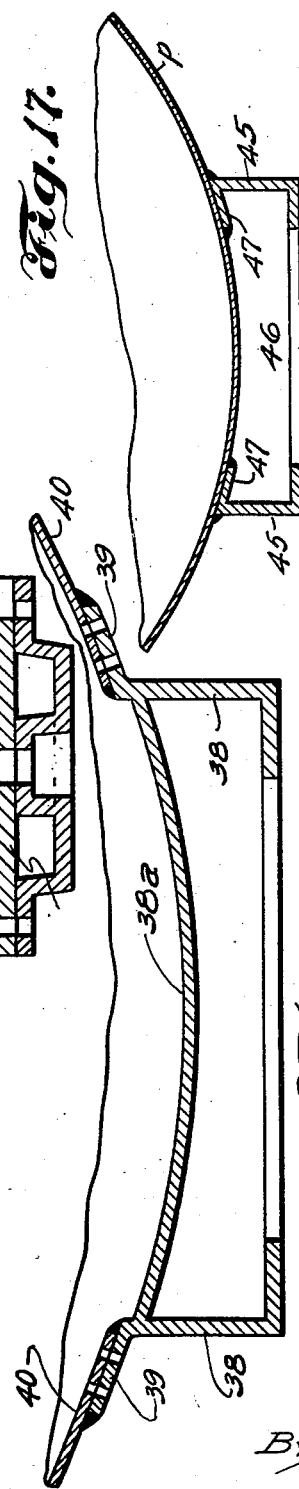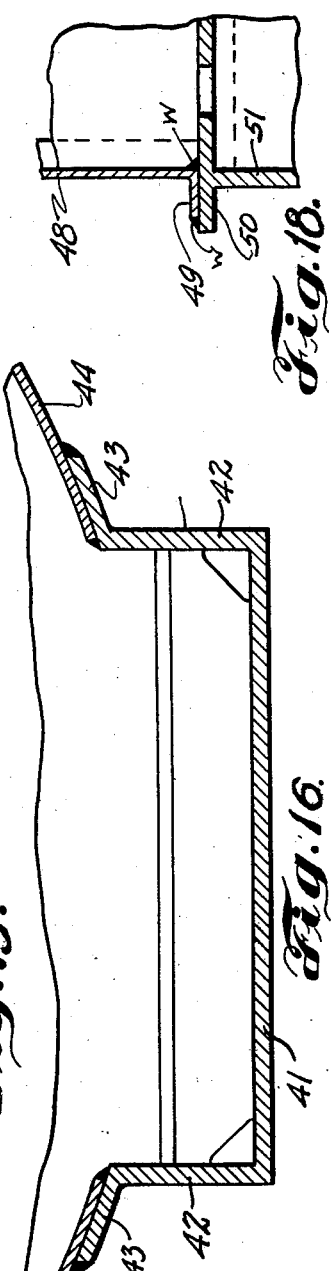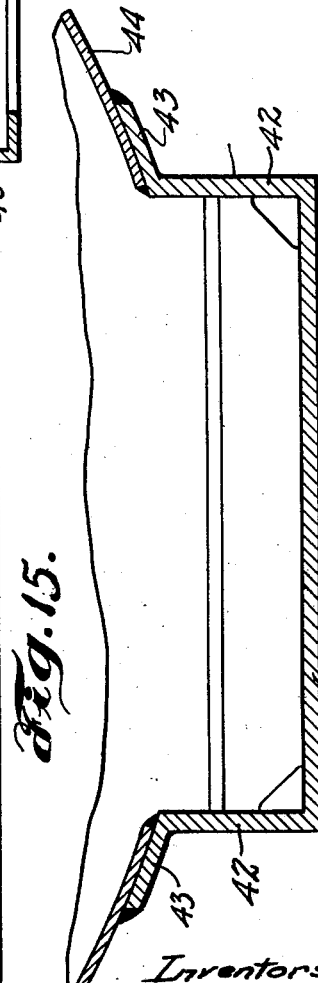

July 5, 1932.  K. S. HOWARD ET AL  1,865,520
RAILWAY VEHICLE STRUCTURE
Filed Aug. 24, 1927   6 Sheets-Sheet 5

INVENTORS
Karl S. Howard
Einar G. Hallquist
By Cornwall, Bedell & James
ATTORNEYS July 5, 1932. K. S. HOWARD ET AL 1,865,520
RAILWAY VEHICLE STRUCTURE
Filed Aug. 24, 1927 6 Sheets-Sheet 6
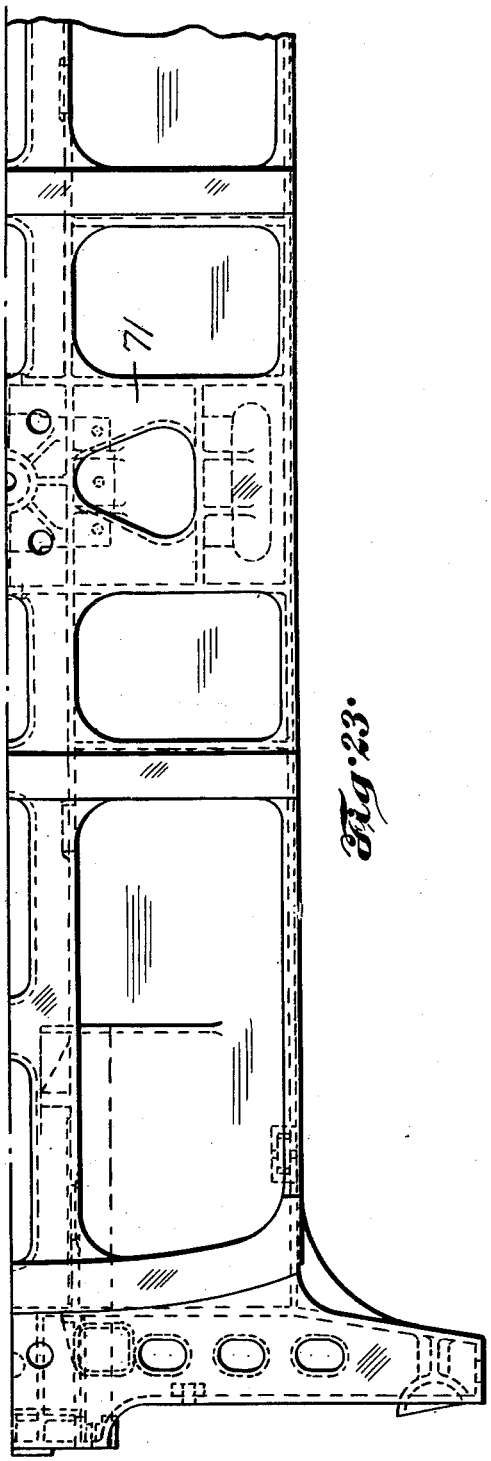
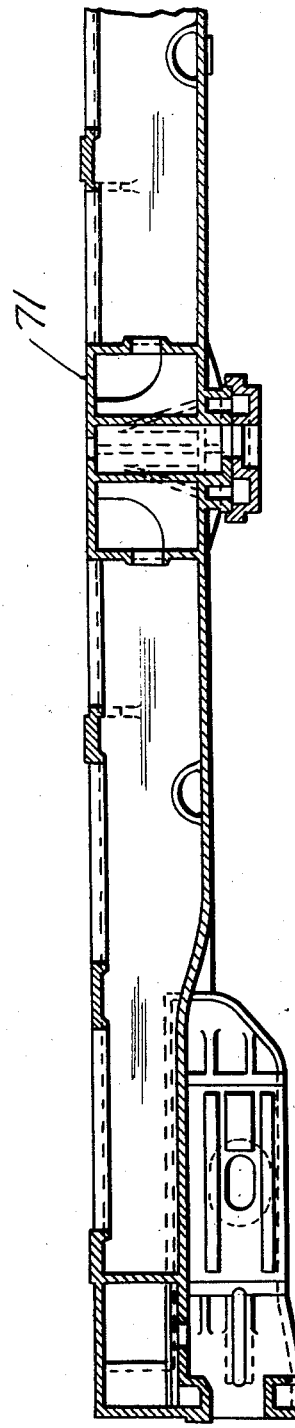
INVENTORS
Karl S. Howard
Einar G. Hollquist
ATTORNEYS Patented July 5, 1932

1,865,520

UNITED STATES PATENT OFFICE

KARL S. HOWARD, OF ST. LOUIS, MISSOURI, AND EINAR G. HALLQUIST, OF EDWARDS-VILLE, ILLINOIS, ASSIGNORS, BY MESNE ASSIGNMENTS, TO GENERAL STEEL CASTINGS CORPORATION, OF GRANITE CITY, ILLINOIS, A CORPORATION OF DELAWARE

RAILWAY VEHICLE STRUCTURE

Application filed August 24, 1927. Serial No. 215,172.

Our invention relates to railway rolling stock and consists in an improved vehicle underframe and tank structure developed particularly in connection with locomotive tenders but also adapted for use in other railway vehicles in which it is desired to carry water or other liquid.

The general objects of our invention are to reduce the total weight of the underframe and superstructure; to lower the center of gravity of the car, either light or loaded; to eliminate the wood floor usually provided for the ordinary tank and thereby avoid the corrosion which develops in the bottom sheets of a tank resting on a wood floor; to provide a rigid economical structure of the form described by reducing the number of parts, the weight of material, and the amount of labor required for assembling the same; and to facilitate the application of the brake cylinder and reservoir, the brake staff, side and center bearings, discharge lines, train piping and other equipment.

We accomplish these objects by use of an improved underframe and by uniting the underframe and superstructure so as to utilize the latter as part of the vehicle framing and to utilize the underframe as a part of the tank structure. Preferably all or a substantial part of the underframe as applied to a locomotive tender comprises a one-piece casting.

In the accompanying drawings which illustrate our invention—

Figure 1 is a side elevation of a complete tender embodying our invention.

Figure 2 is a one-half longitudinal top view of our tender frame.

Figure 3 is a vertical longitudinal section taken on the center line of the frame.

Figures 4, 5, 6 and 7 are vertical transverse sections taken approximately on lines 4—4, 5—5, 6—6, and 7—7 of Figure 3.

Figure 8 is an end elevation of the rear end of the underframe.

Figure 9 is an end elevation of the front end of the underframe.

Figures 10 and 11 are vertical transverse sections taken on lines 10—10 and 11—11 of Figure 2.

Figure 12 is a section on line 12—12 of Figure 1.

Figure 13 is a longitudinal vertical section taken on line 13—13 of Figure 10.

Figures 14, 15, 16 and 17 are vertical transverse sections illustrating modified forms of our invention.

Figure 18 is a vertical longitudinal section showing a modification in the connection between the underframe and the end plate of the superstructure.

Figure 19:
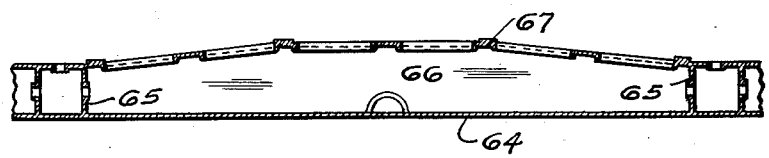

Figure 19 is a vertical longitudinal section through that portion of a modified underframe which extends between the bolsters.

Figure 20:
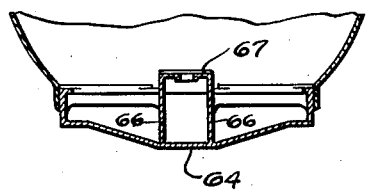

Figure 20 is a transverse section through the frame shown in Figure 19.

Figure 21:
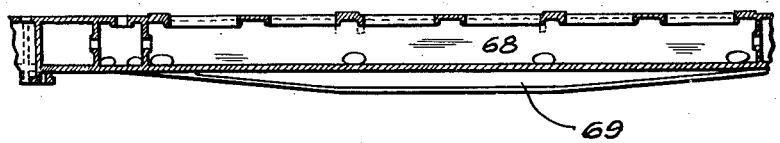

Figure 21 is a vertical longitudinal section corresponding to Figure 19 but illustrating another modification.

Figure 22:
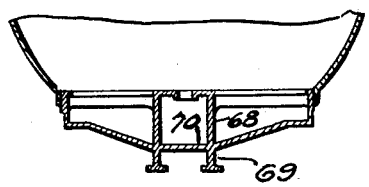

Figure 22 is a vertical transverse section through the frame shown in Figure 21.

Figure 23 is a top view of a modified form illustrating the use of a single body bolster.

Figure 24 is a vertical longitudinal section through the same.

In the structure illustrated in Figures 1 to 13 inclusive, the tender underframe is shown as consisting of a one-piece casting including side sills 1 and a box section center sill comprising side walls 2, a top wall 3, and a bottom wall or web 4 which is inclined upwardly and outwardly from the bottom of the center sill to the bottom of the side sills. The box section center sill extends between the end sills 5 and 6 and the portion of the center sill intermediate the bolsters is deeper than the end portions whereby a box section fish-belly structure is produced. This increases the strength of the frame and also its water capacity as all of the center sill is utilized for storage. One or more suitable bosses 57 may be provided at the lowermost portion of the center sill for connecting a drain pipe, and the same may be used for the line which pumps water to the boiler or other connections may be provided for this purpose at higher levels so as to avoid the drawing off of sending into the boiler.

One end of the underframe is provided with depending elements 7 which form pockets for the drawbar connection to the locomotive. The other end of the underframe is provided with depending elements 8 which form suitable members for mounting the usual draft rigging. At this end of the underframe the bottom of the center sill is elevated to provide clearance for the draft rigging. The box section center sill, and the underframe as a whole, form one or more water carrying compartments or the bottom of a tank structure which is completed by the securing thereto of superstructure side plates 9 and end plates 10. The side sills are provided with raised pads 11 having vertical surfaces to which the downwardly flanged edges 12 of the side sheets may be welded or riveted. The lower edges of the end sheets are flanged and secured to suitable pads 13 provided on the end sills and having finished horizontal surfaces. Intermediate the end sills the underframe is provided with transverse pads 13$^a$ which are preferably machined and are adapted to mount the structural steel braces B which extend upwardly from the side sills and reinforce the side plates 9.

The underframe illustrated is of the double bolster type, and each bolster comprises vertical side walls 14 and the extension 15 of web 4 forms bottom walls for these bolsters. This extension is recessed upwardly between adjacent bolsters to accommodate the side bearing elements of the truck and body. Preferably the web 15 is provided with suitable depending brackets 16 for mounting the center plate and suitable outwardly and horizontally extending pads 17 for mounting side bearing elements.

In the tender illustrated, an oil tank T is provided and a suitable pipe 58 may be welded to the underframe to extend upwardly through the water tank into the space provided for the oil tank (Fig. 11). The inclined bottom web 4 is provided with a horizontal boss 58$^a$ to which the fuel feed line leading to the fire box may be connected.

Between the bolsters a portion 18 of the bottom web (Fig. 10) extends horizontally inwardly from the side sill and depending angular brackets 19 are formed integrally with this portion of the bottom web for the purpose of mounting the air brake cylinder A. With this arrangement the bolts 60 which secure the cylinder may be applied from beneath the water holding compartment of the underframe. Near the brackets 19, the bottom web of the underframe is perforated as indicated at 20 (Fig. 12) and a pipe 21 is welded to the underframe and extends upwardly through the tank superstructure, the same forming a sleeve for the brake staff 59. The pipe 29 extends to the roof of the tank as shown in Figure 1 and forms a drain from the top of the tank.

The depending elements 8 on the rear end sill 6 are recessed as indicated at 23 to receive and support train piping which will be held in place by suitable clips 24.

In the modification illustrated in Figure 14 the box section center sill 31 is retained but the bottom web 32 is curved upwardly from the lower portion of the center sill and extends outwardly horizontally. At the bolster the bottom web terminates in a pad 32$^a$ for mounting a side bearing, and spaced from the side sill to provide clearance for the truck wheels. On either side of the side bearing the horizontal web extends out to the side 33 of the underframe. The superstructure plates 34 have their lower edges flanged inwardly to overlie the horizontal pads 36 formed on the top wall 37 of the underframe.

In the construction shown in Figure 15 the underframe is little more than a draft transmitting member with vertical webs 38 and an arcuate top wall 38$^a$ having flanges 39 to which the lower edges of the curved tank plates 40 may be riveted or welded.

In the construction shown in Figure 16 the underframe casting is of angular cross section with a single lower wall 41 and side walls 42 which are flanged outwardly as indicated at 43 to support the curved tank structure 44.

In the construction shown in Figure 17, the underframe comprises spaced sills 45 united at intervals by suitable cross ties 46 and having inturned flanges 47. In this structure, tank plates $p$ form a complete cylindrical tank. While the underframe does not serve as a water compartment, the lower portion of the tank extends below the top of the underframe sills 45. With this structure it will be possible to utilize existing tanks.

Figure 18 indicates a modification of a connection between the end plate of the tank and the underframe. The tank end plate 48 is flanged outwardly, as indicated at 49, and welded or riveted to a corresponding flange 50 formed on the underframe end sill 51.

In Figures 19 and 20 we illustrate an underframe in which the bottom wall 64 extends in a straight line between bolsters 65 but the sides 66 of the center sill are higher at the center of the underframe to provide greater rigidity and the tops of these sills and the top wall 67 of the center sill may project up into the tank formed by the plate superstructure.

In Figures 21 and 22 the box center sill structure is substantially the same depth from end to end but its sides 68 have integral flanged extensions 69 which project downwardly below the bottom wall 70 and are deepest at the center of the frame. This construction provides another arrangement whereby the underframe may be reinforced between bolsters in order to safely carry a heavy load.

In Figures 23 and 24 we illustrate one end of a tender underframe in which a single body bolster 71 is used instead of a double body bolster illustrated in Figures 2 and 3. The transverse section through this bolster may be the same as that through the double body bolster as indicated in Figure 4 or the section may be modified as to detail as desired.

In each form of our invention the heavy plates of the superstructure reinforce the underframe and serve to resist some of the vertical and longitudinal stresses which ordinarily must be taken care of entirely by the underframe. By utilizing the underframe casting to form a part of the bottom of the tank the quantity of superstructure material usually required is reduced.

It is obvious that in any form of our invention the center of gravity of the loaded car is lower than in ordinary tank structures in which a complete cylindrical tank is formed separately and mounted on the top of a separately formed underframe.

Various other modifications other than those illustrated may be made by those familiar with railway art without departing from the spirit of our invention and we contemplate the exclusive use of all such variations as fall within the scope of our claims.

We claim:

1. In a railway vehicle underframe casting, a box section longitudinal sill member adapted to form a portion of a tank structure.

2. In a railway vehicle underframe casting, a box section longitudinal sill member, said section being of less depth near the ends of the underframe, and draft gear mounting elements integral with said member and extending below the more shallow portion of the latter.

3. In a railway vehicle underframe casting, a box section center sill member extending from end to end of the underframe and adapted to form a portion of a tank structure.

4. A railway vehicle underframe casting comprising side sills, end sills and bottom web elements extending between side sills from end sill to end sill to form therewith a lower portion of a tank structure.

5. In a railway vehicle underframe casting, a center sill, a side sill and a bottom web sloping upwardly from said center sill to form therewith a liquid container.

6. In a railway vehicle underframe casting, a center sill, a side sill and a bottom web sloping upwardly from the bottom of said center sill to the bottom of said side sill.

7. In a railway vehicle underframe casting, a center sill, a side sill and a bottom web sloping upwardly from the bottom of said center sill to the bottom of said side sill, said web being recessed upwardly to accommodate side bearing elements.

8. In a railway vehicle underframe casting, a center sill, a side sill, a bottom web inclined between said sills, a portion of said web extending inwardly horizontally from said side sill to mount brake equipment.

9. In a railway vehicle underframe casting adapted to form the bottom of a tank structure, a side sill, a center sill, an inclined bottom web between said sills and a perforated element on said web having a downwardly facing horizontal surface for mounting a discharge line connection.

10. In a railway vehicle underframe casting, a center sill, a side sill, double bolsters, an inclined bottom web between said center sill and side sill on both sides of said bolsters and an inclined bottom web between said bolsters and recessed upwardly above the level of said web on either side of said bolsters.

11. In a railway vehicle underframe casting adapted to form the bottom of a tank structure, a bottom web, and a vertical sleeve extending upwardly from said web to receive a brake staff passing through said web.

12. In a railway vehicle underframe casting, spaced bolsters having sides and inclined bottom walls, adapted to form a tank bottom, and substantially horizontal elements between bolsters for mounting side bearings.

13. In a railway vehicle underframe, a bottom web adapted to form the bottom of a tank structure and members integral with said web and having horizontal surfaces spaced from said web and perforated to receive equipment mounting elements applied exteriorly of the tank structure.

14. In a cast underframe for a railway vehicle, a coupler support member provided with integral elements for receiving a train pipe.

15. In a cast underframe for a railway vehicle, an end sill, depending members on said sill, a coupler support between said members, said members having recesses formed in their outer faces for receiving train pipes located on opposite sides of the coupler.

16. In a railway vehicle, an underframe, including spaced bolsters, and a tank in the form of a flattened cylinder, a part of said underframe between said bolsters forming the flat side of said cylinder.

17. In a railway vehicle, an underframe, and a tank in the form of a flattened cylinder from end to end, the flat side of the cylinder being formed by said underframe.

18. In a railway vehicle, a one-piece underframe, and a tank in the form of a flattened cylinder throughout the length, the flat side of the cylinder being formed by said underframe.

19. In a railway vehicle, an underframe including spaced sills, and a plate superstructure curved from each of said sills substantially throughout their length and extending upwardly, outwardly, and inwardly, said underframe and superstructure forming a liquid tank.

20. In a railway vehicle, a one-piece cast underframe, and a plate superstructure of cylindrical form having an opening in its lower portion and fitting over said underframe with the edges of said superstructure flanged downwardly and secured to the sides of said underframe.

21. A railway tank vehicle comprising a longitudinal cylindrical tank extending the full length of the vehicle, the bottom of which tank consists of an underframe casting.

22. In a railway tank vehicle, a one-piece underframe having longitudinal sills, a web extending outwardly from said sills and having a vertical member at its outer edge, and a curved plate superstructure having its edge flanged vertically and secured to said member.

23. In a railway tank vehicle, a cast underframe having vertical surfaces at its sides and horizontal surfaces at its ends, and a plate superstructure forming a cylinder-like body, the sides of which are bent downwardly at points spaced from the longitudinal center line of the body and secured to said vertical surfaces, the ends of said body being flanged and secured to said horizontal surfaces.

24. In a railway vehicle, a one-piece underframe having longitudinal side sills and a bottom member between said sills, a curved plate structure secured to said sills and forming with said sills and said member the sides and bottom of a cylindrically shaped tank, and an end plate secured to said curved plates and to said underframe to complete the tank.

25. In a railway vehicle underframe casting adapted to form the bottom of a tank structure, a side sill, a center sill, an inclined bottom web between said sills, and a hollow downward extension on said web for mounting a discharge pipe connection at a point substantially spaced from said web.

26. In a railway vehicle underframe casting adapted to form the bottom of a tank structure, a side sill, a center sill, an inclined bottom web between said sills, and a hollow downward extension on said web and flanged at its lower end for mounting a discharge pipe connection at a point substantially spaced from said web.

27. In a railway vehicle underframe casting, an inclined bottom wall adapted to form a tank bottom, and an element on the exterior of said wall extending outwardly therefrom for mounting a side bearing.

28. In a railway vehicle, an underframe having a fish-belly center sill of box-shaped cross section adapted to contain liquid.

29. In a railway vehicle, an underframe having bolsters, side sills, a fish-belly center sill between said bolsters, and horizontal webs extending between said center sill and side sills, said underframe being adapted to contain liquid.

30. In a railway vehicle underframe, side sills, end sills, a double body bolster between said end sills, and a bottom web, said underframe forming a tank bottom.

31. In a railway vehicle underframe, end sills, double body bolsters spaced from said end sills, and a fish-belly center sill between said bolsters, said underframe forming a tank bottom.

32. In a railway vehicle underframe, end sills, double body bolsters spaced from said end sills, and a fish-belly box-section center sill between said bolsters adapted to contain liquid.

33. In a railway vehicle underframe, end sills, body bolsters spaced from said end sills, and a box section center sill between said bolsters adapted to contain liquid.

34. In a railway vehicle underframe casting, end sills, bolsters spaced from said end sills, and a box section center sill member extending between said end sills and adapted to contain liquid throughout its length between said end sills.

35. In a railway vehicle, an underframe casting adapted to contain liquid and provided with a fish-belly center sill.

36. In a railway tank vehicle, an underframe casting, superstructure plates secured thereto at the sides thereof, said plates and casting forming the bottom of a tank, and braces for said plates extending across said casting and secured thereto and to said plates.

37. In a railway tank vehicle, an underframe casting having pads on its upper face, braces mounted on said pads and extending upwardly therefrom, and superstructure plates secured to said braces and to said casting beyond the ends of said pads.

38. In a railway vehicle underframe casting, end sills, bolsters spaced from said end sills, and a box-section center sill member extending between said end sills and adapted to contain liquid throughout its length between said end sills.

39. In a railway vehicle underframe casting, end sills, double bolsters spaced from said end sills, and a box section center sill extending between said end sill and adapted to contain liquid throughout its length between said end sills.

40. The combination in a railway vehicle, of a central longitudinal frame cast in one piece and extending from one end of the vehicle to the other; and side plates turned under at the bottom and secured to the frame, said turned in portions of said side plates forming with the frame the bottom of the vehicle.

41. The combination in a railway vehicle, of a cast metal frame extending from one end of the vehicle to the other and less in width than the vehicle; plates forming the sides of the vehicle, and sheet metal bottom plates, said bottom and side plates being secured to the longitudinal edges of the frame.

42. The combination in a railway vehicle, of a cast metal frame extending from one end of the vehicle to the other and less in width than the width of the vehicle, said cast metal frame having top and bottom plates and connecting webs for said plates, the top plate and the webs being perforated for circulation of a fluid; side plates of sheet metal; and bottom extensions also of sheet metal connecting the side plates with the edges of the frame and forming a portion of the bottom of the vehicle.

43. A railway vehicle underframe casting comprising center sills, draft sills and end sills, and a bottom web extending from end sill to end sill between said center sills and said draft sills to form the lower portion of a tank structure.

44. The combination in a railway vehicle, of a tank and an integral underframe, said underframe being less in width than said tank and forming at least a portion of the bottom of said tank.

45. The combination in a railway vehicle, of a tank and a cast metal frame adapted to carry the longitudinal pulling and buffing forces, said frame being less in width than said tank and forming at least a portion of the bottom of said tank and adapted to contain liquids.

46. The combination in a railway vehicle, of a tank and an integral underframe extending the full length of said tank, said underframe being less in width than said tank and forming at least a portion of the bottom of said tank.

47. The combination in a railway vehicle, of a tank and an integral underframe having a depth which is greater intermediate its ends and being less in width than said tank and forming at least a portion of the bottom of said tank.

48. A railway tank vehicle comprising a longitudinal cylindrical tank extending substantially the full length of the vehicle, the bottom of which tank consists of an underframe formed integrally.

49. In a railway vehicle underframe, bolsters, a center sill and a web plate extending between said bolsters, said sill projecting upwardly from said web plate and having a greater depth at a portion intermediate the bolsters, said underframe being adapted to contain liquids.

50. In a railway vehicle underframe casting adapted to form the bottom of a tank structure, a bottom web, and a vertical sleeve extending upwardly from said web to the roof of the tank to form a drain from the top of the tank.

51. In a railway vehicle underframe casting, a center sill, a side sill, a bottom web inclined between said sills, a portion of said web having a recess between said sills to mount brake equipment.

52. In a railway underframe, an imperforate plate-like main longitudinal member including an intermediate portion arcuate in cross section, said member having bolsters and draft sills formed as integral parts thereof.

53. In an integral structure constituting a railway tank car underframe, a web extending from end to end of the tank and forming the tank bottom and a part of the car underframe and draft sills merging with and extending outwardly from said web to the end of the car.

In testimony whereof we hereunto affix our signatures this 10th day of August, 1927.

KARL S. HOWARD.
EINAR G. HALLQUIST.